F. E. BLAISDELL.
ELASTIC TIRE FOR THE WHEELS OF VEHICLES.
APPLICATION FILED AUG. 10, 1909.

1,035,851.    Patented Aug. 20, 1912.

WITNESSES:
John C. Sanders
John A. Percival

INVENTOR:
Frederick Elijah Blaisdell
BY
ATTY

UNITED STATES PATENT OFFICE.

FREDERICK ELIJAH BLAISDELL, OF HAMMERSMITH, ENGLAND.

ELASTIC TIRE FOR THE WHEELS OF VEHICLES.

1,035,851.  Specification of Letters Patent.  Patented Aug. 20, 1912.

Application filed August 10, 1909. Serial No. 512,172.

*To all whom it may concern:*

Be it known that I, FREDERICK ELIJAH BLAISDELL, citizen of the United States, residing at West Lodge Works, Lower Mall, Hammersmith, in the county of Middlesex, England, have invented new and useful Improvements in Elastic Tires for the Wheels of Vehicles, of which the following is a specification.

This invention relates to an improved construction of elastic tire for a wheel, the core of which is built up of a plural winding of a stretched ribbon of vulcanized rubber on a central support.

The ribbon or tape, prior to the winding, is rendered adhesive by a layer of rubber solution with the addition of a sufficient quantity of sulfur to effect the vulcanization of the rubber contained in the solution, the solvent being evaporated before the winding takes place. The core thus constructed is in a condition to withstand a vulcanizing heat without a material loss of the stored mechanical energy.

According to a preferred form of construction the core is formed as an elongated cylinder of energized vulcanized rubber in a manner which will be described with reference to the accompanying drawing, the ends thereof being subsequently united to form a continuous ring of uniform section.

Figure 1:
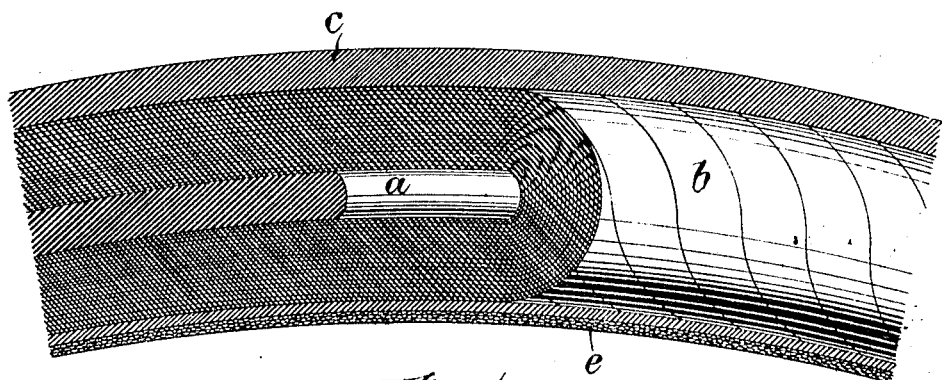
Figure 2:
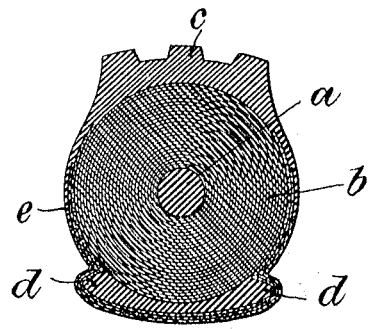

In this drawing:—Figure 1 is a sectional side elevation of a portion of a tire, and Fig. 2 is a section thereof.

On a cylinder *a* of vulcanized rubber or rubber compound which is in an unstrained condition, a ribbon of vulcanized rubber *b*, one or both surfaces of which have been prepared for adhesion by the addition of a layer of rubber solution and sulfur, is wound in tension in an oblique direction so as to cause it to wrap itself in a helical manner with the edges of consecutive convolutions butting against each other so as to completely inclose the cylinder. In performing this operation the ribbon of rubber *b* is caused to be traversed from one end to the other, the pitch of the helical convolution being right-handed suppose, after which the winding is repeated with a left-handed convolution, thereby overlapping in a crossed manner the butting edges of the previous winding and so on successively. As the winding proceeds, the ribbon-wound core increases in diameter and also in length, the latter increase being due to the very intense squeeze to which the heart of the core becomes subjected by the tension applied to the ribbon in the wrapping process.

The effect of the longitudinal strain due to the squeezing action of the tension of the outer layers is to provide a continuing tendency to close, in the direction of the length of the periphery of the tire, any incision which may be made in its surface.

The product of the operation above described is an elongated cylinder of uniform diameter, the major portion of which consists of vulcanized rubber having stored therein a relatively considerable amount of mechanical energy by virtue of the stretched condition of its component layers and in which the internal straining actions are such that, in each unit length of the cylinder, they balance each other independently of its connection to the adjoining portions of the length of the cylinder. Moreover the energized mass of rubber is in such a condition of strain that instead of gaping by an incision of its surface, a wound made by an instrument will tend to close up.

To insure the complete adhesion together of the consecutive layers, the strained mass is subjected to a vulcanizing temperature.

The ring or hoop may be provided with a tread *c*, to take the wear of the road, which tread can be vulcanized to the energized core and be renewed when worn.

To the energized core, or to the tread vulcanized thereto, can also be secured beaded edges of hard rubber *d* fortified with canvas *e* to serve as means of connection to the rim of the wheel in one of the usual ways at present employed.

An energized ring or hoop, manufactured as above described, may be substituted for the inflated air tube at present in use in pneumatic tires and inclosed within a cover as ordinarily made and used with a relatively small alteration of the present wheels.

I claim:

1. A resilient tire for a wheel including a ring-core composed of a plurality of superposed helical wrappings of a ribbon of stretched vulcanized rubber wound around a central element of uniform section formed of vulcanized rubber and between each two adjacent layers of the helically wound ribbon a film of vulcanized rubber so attached to the layers as to unite them to form a continuous mass.

2. A resilient tire for a wheel including a ring-core composed of a plurality of superposed helical wrappings of a ribbon of stretched vulcanized rubber wound around a yielding central element of vulcanized rubber and between each two adjacent layers of the helically wound ribbon a film of vulcanized rubber so attached to the layers as to unite them to form a continuous mass.

In testimony whereof I have signed my name to this specification in the presence of two subscribing witnesses.

FREDERICK ELIJAH BLAISDELL.

Witnesses:
F. L. RAND,
R. J. WILLIAMS.